United States Patent [19]

Ferrari Aggradi et al.

[11] Patent Number: 4,593,917
[45] Date of Patent: Jun. 10, 1986

[54] SEAL SYSTEM, PARTICULARLY SUITABLE FOR THE BALL JOINT OF INSTALLATIONS LAID AT GREAT DEPTHS

[75] Inventors: Gian P. Ferrari Aggradi, Barberino di Mugello; Giampaolo Bonfiglioli, Inzago, both of Italy

[73] Assignees: Nuovo Pignone S.p.A., Florence; Snam S.p.A., Milan, both of Italy

[21] Appl. No.: 719,068

[22] Filed: Apr. 2, 1985

[30] Foreign Application Priority Data

Apr. 3, 1984 [IT] Italy .................................. 20368 A/84

[51] Int. Cl.$^4$ .............................................. F16J 15/24
[52] U.S. Cl. ......................................... 277/30; 277/124
[58] Field of Search ..................... 277/30, 124, 206 A

[56] References Cited

U.S. PATENT DOCUMENTS

| | | | |
|---|---|---|---|
| 3,233,834 | 2/1966 | Cottrell et al. | 277/30 |
| 4,129,306 | 12/1978 | Konno | 277/30 |
| 4,300,776 | 11/1981 | Taubenmann | 277/124 |
| 4,311,313 | 1/1982 | Vepoua | 277/30 |
| 4,480,842 | 11/1984 | Mahyera | 277/30 |

FOREIGN PATENT DOCUMENTS 772520 11/1967 Canada .................................. 277/30

Primary Examiner—Robert I. Smith
Attorney, Agent, or Firm—Birch, Stewart, Kolasch & Birch

[57] ABSTRACT

A seal system for a spherical joint in which the metal seal ring is sandwiched coaxially between two wedge-shaped metal compression rings which are inserted into corresponding cavities in the front surfaces of the seal ring and are pressed against a metal stop ring by a series of flat springs which become preloaded as a result of forcing the female part of the joint onto the male part.

3 Claims, 2 Drawing Figures ing invention is to obviate said drawbacks by providing a seal system which is practically of unlimited life, of intrinsic elasticity such as to be able to always compensate for the small degrees of settling of the system which locks together the female and male parts of the joint, and is also self-energized by the internal pressure.

SEAL SYSTEM, PARTICULARLY SUITABLE FOR THE BALL JOINT OF INSTALLATIONS LAID AT GREAT DEPTHS

BACKGROUND OF THE INVENTION

1. Field of the Invention

This invention relates to a seal system which, being completely metallic and self-energized by the internal pressure, enables a seal to be obtained which is of practically unlimited life and high reliability, so that it can be effectively applied to underwater installations laid at great depths. In this respect, it finds particular application in the ball joints of the sleeves used for repairing damaged underwater pipelines.

The known cycle of operations required for repairing a damaged underwater pipeline comprises cutting-away the damaged portion of the pipeline, joining an outer sleeve in a sealed manner onto the two cut ends of the pipeline, and joining together the now intact ends of the pipeline by means of an intermediate pipe portion which is prepared on the surface and is locked between said sleeves in a sealed manner.

In order to compensate for the inevitable angular misalignments between the two cut ends, the two outer sleeves are provided in their terminal part with a spherical surface which constitutes the male part of a ball joint and mates with the corresponding spherical surface, ie the female part, provided at the ends of said intermediate pipe portion which is prepared on the surface.

In this manner it is possible to accommodate angular misalignments up to 12°, this being the maximum allowable in that any greater compensation would prevent the necessary passage of the so-called "pigs" inside the pipe, these being those trolleys which are fitted out for weld radiography and for checking the mechanical pipeline characteristics.

It is apparent that in order to prevent the fluid which flows under pressure in the pipeline from leaking between said male and female parts of the ball joint, an effective seal must be provided which ensures tightness for the longest possible time, given that it has to operate at large depths where it is extremely difficult and costly to carry out replacement operations.

The seal must also possess the intrinsic elasticity necessary to compensate for any settling of the locking system between the male and female parts.

Various systems are already known in the state of the art for forming such a seal.

One of the known systems consists of using conventional elastomer seal rings, commonly known as O-rings, which while possessing adequate intrinsic elasticity do not guarantee a sufficient life.

In another known system, a ring of soft metal material, such as soft iron, is used instead of an elastomer ring, but in this case although the seal system has an adequate life it does not possess the necessary intrinsic elasticity.

According to a further known system, a Belleville spring is used as the seal member. In this case, the seal system is completely metallic, and thus possesses the required complete reliability and limitless life, and in addition possesses the necessary intrinsic elasticity. It would therefore seem the ideal system, but in fact it has the drawback of forming the seal in a practically point-like zone where two edges of the spring dig into the male and female parts of the joint respectively, with the result that the spring forms surface impressions in said parts, thus damaging them and preventing any disengagement and re-engagement between the male and female parts required as a result of maintenance or replacement of the deteriorated spring. In addition, the continuous digging action can lead to loss of seal. Finally, said system is not self-energized by the internal pressure, which in fact does not aid sealing but instead tends to separate the spring from the contact zone on the surface of the female part.

The object of the present invention is to obviate said drawbacks by providing a seal system which is practically of unlimited life, of intrinsic elasticity such as to be able to always compensate for the small degrees of settling of the system which locks together the female and male parts of the joint, and is also self-energized by the internal pressure.

This is attained substantially in that a seal ring of metal, and thus highly reliable and of unlimited life, is forced by way of its two circumferential surfaces against the outer surface of the male part and against the inner surface of the female part of the ball joint by two wedge-shaped metal compression rings, between which it is sandwiched and which are inserted into corresponding cavities of said seal ring. Said rings are contained in a circumferential cavity provided in the inner surface of said female part and are axially pressed against a stop ring of said female part by a series of flat springs which, when the female part is forced onto the male part, undergo a deflection which provides the preload necessary for engaging the seal system by ensuring a suitable specific contact pressure between the seal ring and the male and female parts of the joint, and for ensuring sealing even in the case of small degrees of settlement of the system which locks together the male and female parts.

Such a completely metallic and intrinsically elastic system is also obviously self-energized by the internal pressure in that the action of this latter is added to the preload exerted by said springs, and thus any increase in the internal pressure increases the specific contact pressure between the seal ring and the male and female parts of the joint.

Thus, the seal system for providing sealing between the male part and female part of a ball joint, said system comprising a metal seal ring inserted in a circumferential cavity provided in the inner surface of said female part of the joint, is characterized according to the present invention in that said metal seal ring is sandwiched coaxially between two wedge-shaped metal compression rings which are inserted into corresponding cavities provided in the front surfaces of said metal seal ring and are pressed against a metal stop ring rigid with said female part of the joint by a series of flat springs which become preloaded as a result of undergoing deflection during the forcing of the female part of the joint onto the male part. In order to increase the sealing effect due to the forcing of the two circumferential surfaces of the metal seal ring against the outer surface of the male part and against the inner surface of the female part of the ball joint respectively, according to a further characteristic of the present invention there is provided on said circumferential surfaces of the metal seal ring a central inflection which increases the elasticity of the ring in a radial direction.

The invention is described in detail hereinafter with reference to the accompanying drawings which illustrate a preferred embodiment thereof, which is given by way of non-limiting example in that technical or constructional modifications can be made thereto without leaving the scope of the inventive idea.

It is likewise apparent that the invention, which is described specifically in terms of its application to the ball joint of the sleeves used in repairing underwater pipelines, can be also applied for forming a seal between elements which are not necessarily spherical, but for example conical for other applications in the underwater installation field, such as sealing well head connectors, without leaving the scope of the present invention.

DETAILED DESCRIPTION OF THE PREFERRED EMBODIMENTS

Figure 1:
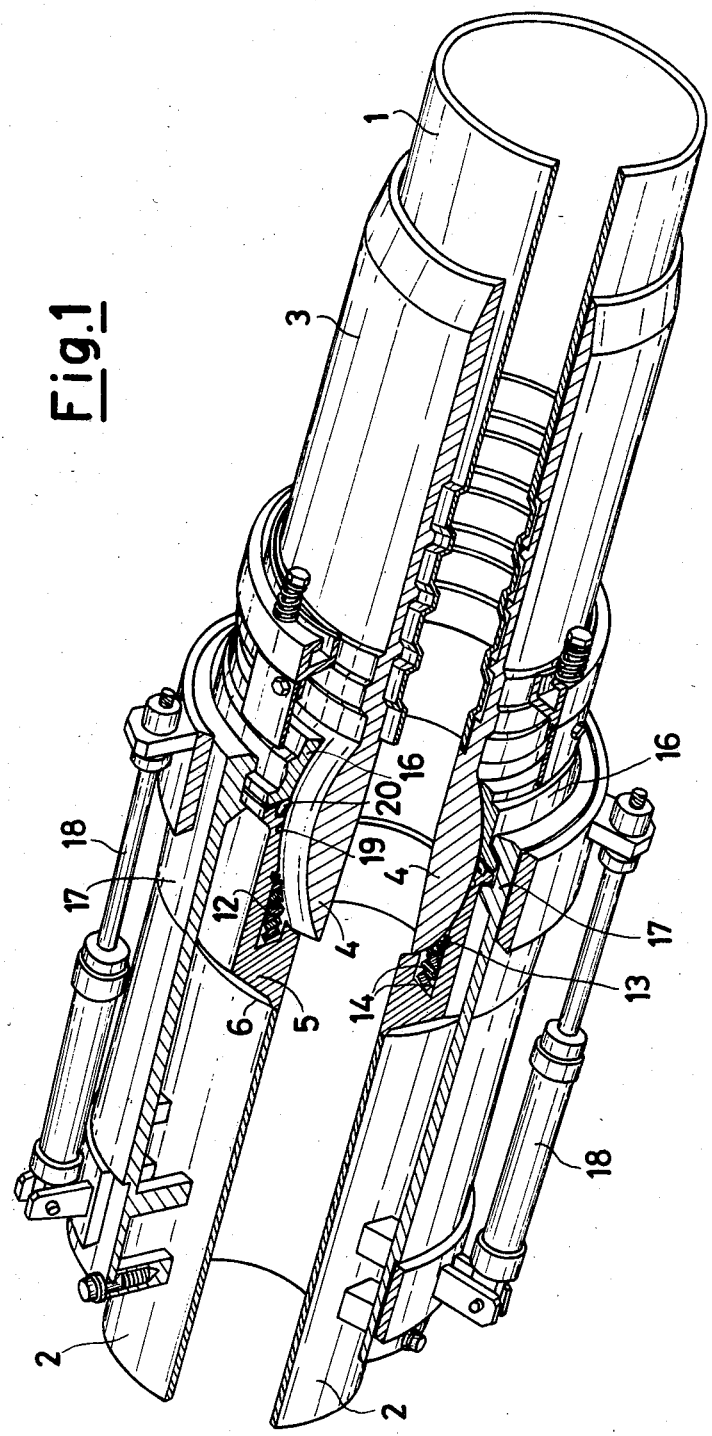
FIG. 1 is a partial, sectional perspective view of the seal system of the invention applied to the ball joint between an intermediate pipe portion and a sleeve fixed to a pipeline to be repaired.
Figure 2:
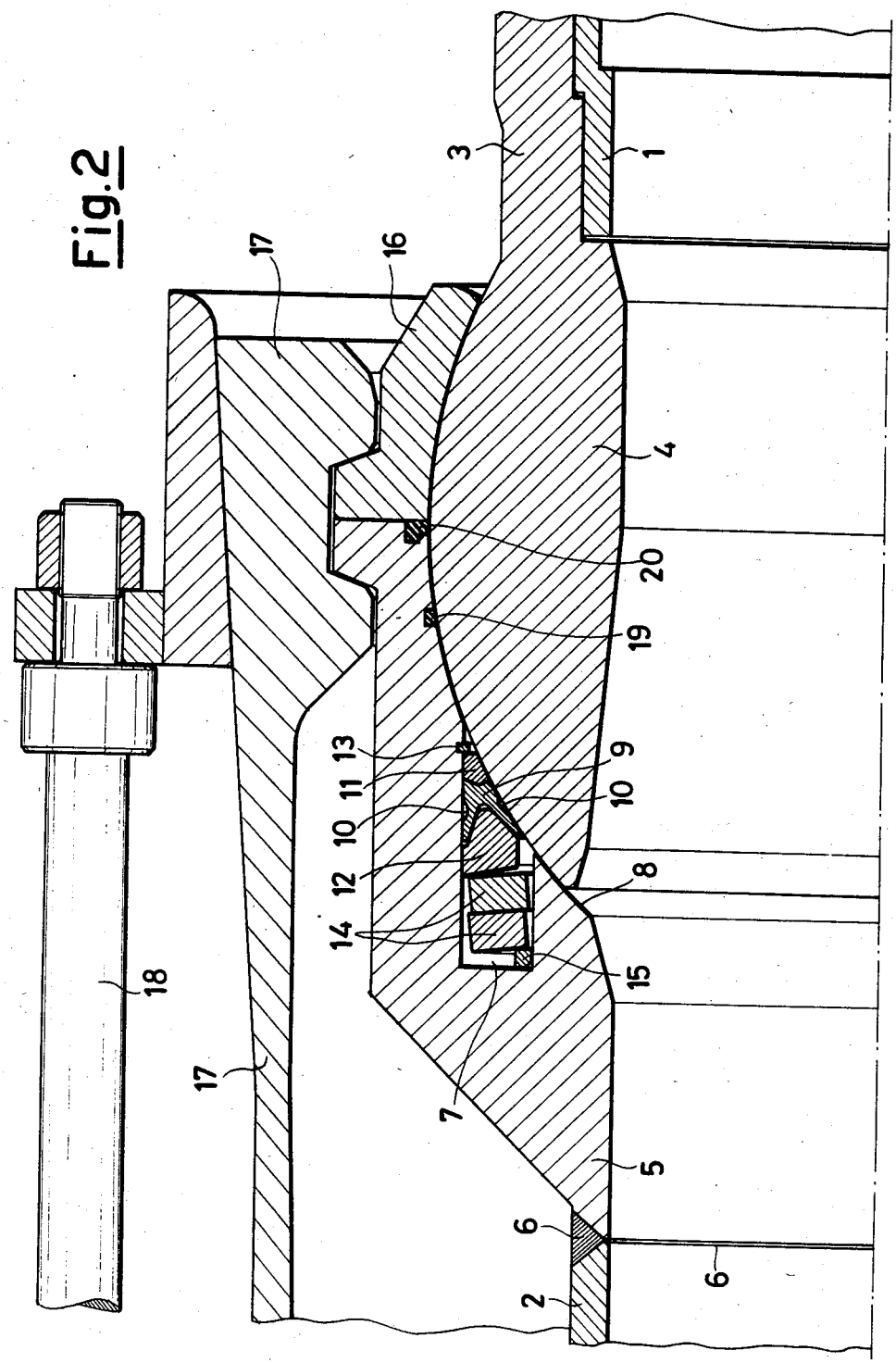
FIG. 2 is a longitudinal partial section through the structure of FIG. 1.

In the figures, the reference numeral 1 indicates a cut end of an underwater pipeline, from which the damaged pipe portion has been removed and which is to be reconnected in a rotatable manner to the other cut end (not shown in the figure) by means of an intermediate pipe portion 2 prepared on the surface.

For this purpose, there is joined in a sealed manner to said cut end 1 an outer sleeve 3 provided in its terminal part with a spherical surface 4 constituting the male part of a ball joint, the female part 5 of which is fixed by a circumferential weld 6 to the end of said intermediate pipe portion 2.

The sealing between said male part 4 and female part 5 of the ball joint is provided, according to the invention, by a seal system which is housed in a circumferential cavity 7 provided in the inner surface 8 of said female part 5 of the joint.

Said seal system is constituted by a metal seal ring 9 having a central inflection 10 on each of its two circumferential surfaces, and being sandwiched between two coaxial metal compression rings 11 and 12 which have their wedge-shaped axial projection inserted into corresponding cavities provided in the front surfaces of said metal seal ring 9.

The coaxial system comprising the three metal rings 9, 11, 12 is then pressed against a metal stop ring 13, rigid with said female part 5 of the ball joint, by a series of flat springs 14 (two springs are shown in the figure).

Said springs 14, with are separated from the base wall of said cavity 7 by a metal spacer ring 15, then undergo deflection and thus become preloaded when the female part 5 of the joint is forced onto the corresponding male part 4, it then being locked by a normal locking system 16, 17 and 18, which is well known and is therefore not described in detail.

The further safety seals 19 and 20 are also shown in the figures.

We claim:

1. A seal system for providing sealing between the male part and female part of a ball joint, said system comprising a metal seal ring inserted in a circumferential cavity provided in the inner surface of said femal part of the joint, characterised in that said metal seal ring is sandwiched coaxially between two wedge-shaped metal compresssion rings which are inserted into corresponding cavities provided in the front surfaces of said metal seal ring and are pressed against a metal stop ring rigid with said female part of the joint by a series of flat springs which become preloaded as a result of undergoing deflection during the forcing of the female part of the joint onto the corresponding male part.

2. A seal system as claimed in claim 1, characterised in that a central inflection is provided on the circumferential surfaces of said seal ring.

3. A improved seal system, particularly suitable for the ball joint of installations laid at great depths, as substantially described and illustrated herein.

* * * * *